June 30, 1959 — C. VAN DER LELY — 2,892,300
ROTARY RAKING DEVICE

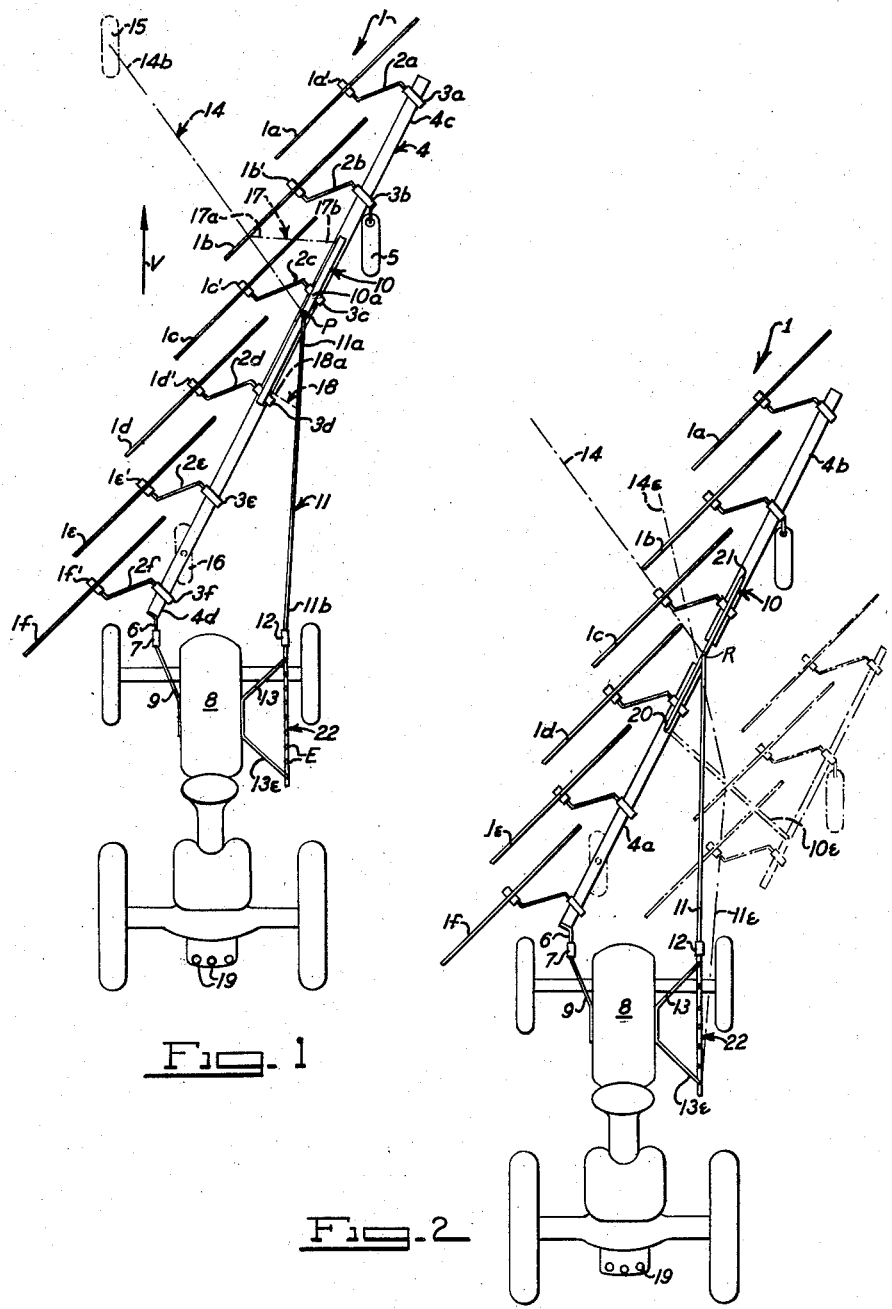

Filed March 16, 1953 — 2 Sheets-Sheet 2

INVENTORS
CORNELIS VAN DER LELY

United States Patent Office 2,892,300
Patented June 30, 1959

2,892,300
ROTARY RAKING DEVICE

Cornelis van der Lely, Maasland, Netherlands, assignor to C. van der Lely Canada Ltd., Ottawa, Ontario, Canada, a corporation of Canada Application March 16, 1953, Serial No. 342,490

Claims priority, application Netherlands March 24, 1952

15 Claims. (Cl. 56—377)

This invention relates to side delivery rakes, swath turners or like raking machines.

Instruments of this general type are known which comprise a mobile frame, a plurality of rotary raking wheels mounted on said frame and rotatable in respective planes at an angle to the direction of travel of the frame, and an arm connected to said frame for imparting travelling movement thereto. The arm may be adapted for adjustment in a substantially horizontal plane to different positions.

In these raking machines, the adjustable arm is constituted by a relatively short draw bar connected to the mobile frame at a point which is located on the foremost part of said frame or at least in front of a plane passing through the rim of the foremost rake wheel, said adjustable arm extending substantially in a horizontal plane approximately at the level of the frame.

It is an object of the present invention to provide an improved raking machine having an adjustable arm of special location and configuration by which the construction of the mobile frame and its forward movement during operation may be greatly simplified, its weight considerably reduced and the location of the rake wheels and their bearings with regard to said frame improved.

Another object of the invention is to increase the range of adjustment of said arm and to enable said arm to be used either as a pulling member or as a pushing member, in order that the raking machine might be either drawn forward by means of animal or motor traction or pushed forward in the same direction of travel.

Another object of the invention is to provide improved means for converting a side delivery rake into a swath turner or tedder and vice versa.

A further object of the invention is to provide a raking machine which can be transformed from a side delivery rake into a swath turner or into a tedder such that the adjustable arm can be used alternatively in all of these types of raking operations as a pulling and/or pushing member.

A still further object of the invention is to provide means to facilitate the transformation referred to above.

With these and other objects, features and advantages in view, embodiments of the invention will next be more fully described with reference to the accompanying drawings in which:

Fig. 1 is a diagrammatic plan view of a side delivery rake being pushed forward by a tractor and constructed in accordance with one embodiment of the invention;

Fig. 2 is a diagrammatic plan view of a side delivery rake which can be transformed into a swath turner in accordance with another embodiment of the invention;

Figures 3, 4:
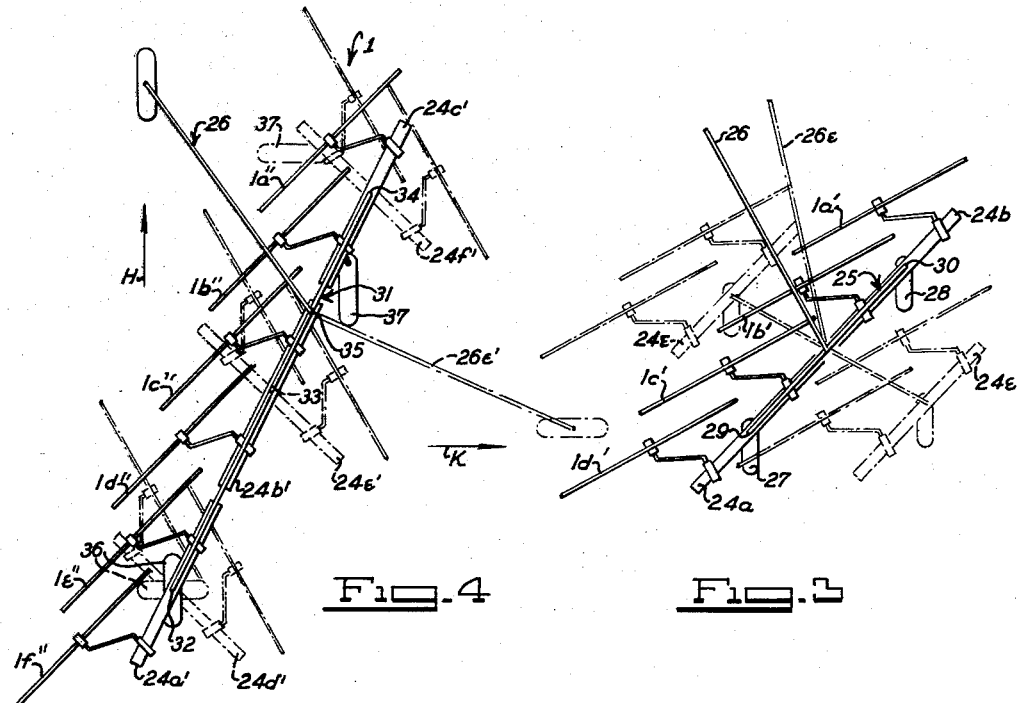
Figs. 3 and 4 are diagrammatic plan views of further side delivery rakes adapted to be pulled forward by a tractor and by animal force, respectively, and which are also transformable into swath turners.

In Fig. 1, the side delivery rake comprises six rake wheels 1a–f, each being freely rotatable on the outer extremity 1a'–f' of a crank 2a–f pivotally mounted in one of the bearings 3a–f on the beam 4 of a vehicular frame. Said beam 4 is provided with a swivel wheel 5 (mounted conventionally as shown, for example, in Austrian Patent No. 170,746 of September 15, 1951) near its front end 4c and a bracket 6 fixed to its rear end 4d. Said bracket 6 is connected by means of a ball-and-socket coupling 7 or a similar conventional universal coupling to a bracket 9 secured to the front of a tractor 8.

The beam 4 further carries a yoke or bow 10 extending above the beam in a vertical plane and having connected to its central elevated portion 10a an end or extremity 11a of an adjustable arm 11. The other end or extremity 11b of said adjustable arm 11 is connected by means of a ball-and-socket coupling 12 to a bar 22 to which a bracket 13, fixedly secured to the front of the tractor 8, is connected.

The connection P of the adjustable arm 11 to the bow 10 is such that said arm can swing in a substantially horizontal plane and enables the beam 4 to assume its correct oblique position with regard to the direction of travel V of the device. When the arm 11 is locked in its working position, said arm insures at the same time the erect position of the rake wheels 1a–f and of the bow 10.

Figure 5:
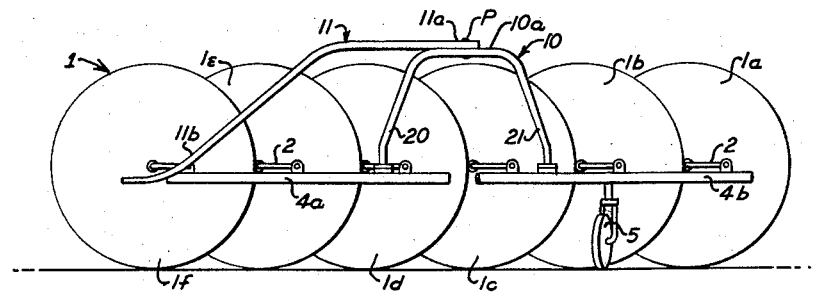
Fig. 5 is a partial side elevation of the device of Fig. 2 viewed from the right and at a right angle to the planes of its rake wheels.

In operation, the beam 4 is maintained, by the running wheel 5 and the bracket 6, approximately at the level of the centers of the rake wheels 1a–f. The coupling elements 7 and 12 are substantially at the same elevation. Parts of the adjustable arm 11 are, however, situated at higher elevations and only the extremity 11b of said arm which is connected by coupling element 12 to the bracket 13 is at the level of the centers of the rake wheels 1a–f, whereas its other extremity 11a which is pivotally mounted on the highest portion or upper part 10a of the bow 10 is at a greater height above the ground than the diameter of the rake wheels (see also Fig. 5). Due to this configuration of the arm 11, it is possible to swing said arm about a vertical axis in a horizontal plane over the rake wheels 1a–f to the position 14 shown in dotted lines.

The extremity 11b of the adjustable arm 11 is provided for the detachable mounting of a running wheel 15. Near running wheel 15, the arm 14 is provided with a conventional hook or like member (see Morrill Patent No. 2,447,354, August 17, 1948) for imparting a tractive force to said arm. This hook can be coupled to the support of the wheel 15 to give the wheel 15 a position corresponding to the direction of said tractive force.

It will be understood that the side delivery rake can be moved forward in this latter case by animal traction for which the beam 4 is provided with a detachable running wheel 16 adjacent the bracket 6.

On a level with but to the rear of the bracket 13, a bracket 13e is secured to the tractor 8. The brackets 13 and 13e are connected by a bar 22 which is provided with a series of eyes E. The coupling element 12 may be connected in any one of said eyes in order to vary the oblique position of the beam 4 with regard to the direction of travel to adjust the width of the area to be worked by the side delivery rake.

In order to lock the adjustable arm 14 in position, a bracing bar 17 can be passed over the rake wheels 1a–f and connected at one end 17a to the adjustable arm 14 and at its other end 17b to the bow 10. The bar 17 may also be used when the adjustable arm 11 is used as a pushing member. In this latter position 18 of the bracing bar, its extremity 18a is preferably connected to the bow 10 at a lower elevation.

If the side delivery rake is to be pulled forward by means of tractor 8, use may be made of fastening means 19 provided at the rear of the tractor whereat the free extremity 11b of the adjustable arm 11 can be coupled.

It will be understood that the invention is not limited to a construction in which the adjustable arm is adapted to be swung around from its pushing position behind the frame to its pulling position in front of the frame although this construction is attended by great advantages. In fact, there will be cases in which the adjustable arm should only be adapted to be used exclusively as a pulling member or as a pushing member, the essential feature of the invention residing in the fact that the said adjustable arm is connected to the mobile frame in such a manner that its both extremities are located on opposite sides of at least one of the wheel planes of the rake wheels and that the extremity 11a lies between the planes of two of said rake wheels.

In the embodiment shown in Fig. 2, the rake wheels 1a-f instead of being supported by a single beam 4 are mounted in series of three on beams 4a and 4b which are connected together by the bow 10. The beam 4a supports the bracket 6 which is connected to the tractor 8 in the same manner as shown in Fig. 1 and the adjustable arm 11 is connected between the coupling 12 and the bow 10. Said bow 10 is pivotally connected with its downwardly extending leg 20 to the beam 4a and with its other downwardly extending leg 21 to the beam 4b (see also Fig. 5). In the position shown in Fig. 2, however, pivotal movement of the legs 20 and 21 with regard to the beams 4a and 4b is effectively prevented by suitable convention locking means (see Pinotti Patent No. 2,261,074, October 28, 1941).

In this position, the device is used as a side delivery rake in the same manner as described with reference to Fig. 1. When, however, the locking means between the legs 20 and 21 of the bow 10 are disengaged, the bow 10 may be swung into the locked position 10e shown in dotted lines. In executing this function, leg 20 pivots on a vertical axis and leg 21, as well as the center of rotation R of the adjustable arm 11 move through arcs. The beam 4b is accordingly swung around the leg 21 of the bow 10 so as to assume the position 4e shown in dotted lines.

With the bow 10 locked in position with regard to beams 4a and 4e, the six rake wheels are arranged in two parallel groups, each comprising three rake wheels in echelon. The device has thus been transformed into a swath turner, the rake wheels on the beam 4a turning a swath and the rake wheels on the beam 4e turning an adjacent swath. The swath turner thus obtained can be moved forward by the adjustable arm 11e or 14e connected to the bow 10e, which arm is used either as a pulling member (position 14e) or as a pushing member (position 11e).

The ends of the brackets 13 and 13e shown in Fig. 2 are connected together by a bar 22 to which the free extremity of the adjustable arm 11 can be secured, as described with reference to Fig. 1. This enables the beams 4a and 4b or 4a and 4e to be adjusted to different oblique positions with regard to the direction of travel so as to vary the working width of the device. When the device is pulled forward by means of the adjustable arm 14 or 14e, the working width of the device can be adjusted by varying the angular position of said arm with regard to the bow 10 or 10e.

Since the distance between the center lines of the swaths depends on the lengths of the beams employed, it is advantageous to enable the bow 10 to be adjusted to different angular positions with regard to the beams 4a and 4e. By placing the bow 10 more nearly perpendicular to the direction of travel, it is possible to turn swaths having their center lines spaced apart at a greater distance. In order to prevent the swaths from being turned over by more than half a turn, the oblique positions of the beams 4a and 4e can be varied.

The devices shown in Figs. 3 and 4 can likewise be respectively used either as a side delivery rake or as a swath turner. For the sake of simplicity, said devices will be described in combination with an adjustable arm which is only employed as a pulling member.

The rake according to Fig. 3 comprises four rake wheels 1a'-d' mounted in pairs on bearing supports or beams 24a and 24b, respectively. Said beams are interconnected by a coupling member or bow 25 corresponding to the bow 10 shown in Fig. 2 and pivotally connected to an adjustable arm 26 serving as a pulling member. In the position shown in full lines, the device acts as a side delivery rake. The relative positions of the various parts is secured by suitable locking means (see Patent No. 2,261,074 cited above). The beam 24a is supported by a running wheel 27 and the beam 24b by a running wheel 28 which latter wheel may be a conventional swivel wheel. Said wheels 27 and 28 are placed below the downwardly extending legs 29 and 30 of the bow 25.

This side delivery rake can be transformed into a swath turner as shown in Fig. 3 by dotted lines. The transformation is effected by turning the bow 25 to the right until it assumes locked position 25e. The beam 24b is moved into locked position 24e and the beam 24a into locked position 24d parallel thereto. Thereafter, the adjustable arm 26 is placed in position 26e and all parts are locked in their new positions.

Figure 6:
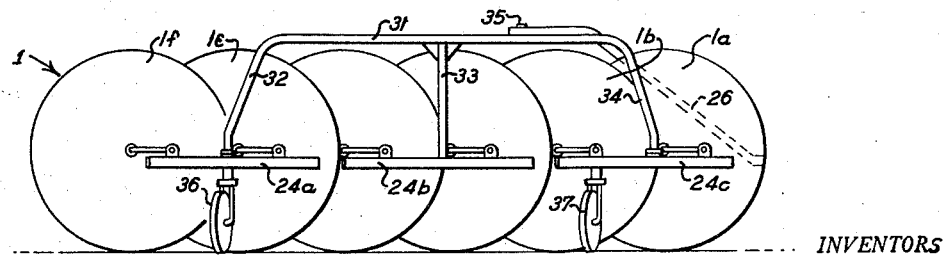
Fig. 6 is a similar side elevation of the device shown in Fig. 4.

The device shown in Fig. 4 comprises six rake wheels 1a''-f'' which are arranged in pairs on three beams 24a', 24b' and 24c', respectively. Said beams are connected together by means of a comb-shaped coupling member 31 having three downwardly extending teeth or transverse members 32, 33 and 34. The member 32 is pivotally mounted on the beam 24a', the intermediate tooth or transverse member 33 is pivotally connected to the beam 24b' and the member 34 is pivotally connected to the beam 24c'. The adjustable arm 26 is pivotally connected to the upper side 35 of the coupling member 31 (see also Fig. 6).

If used as a side delivery rake, the various parts of the device are arranged in the position shown in full lines. Below the tooth 32 of the member 31, the beam 24a' is supported by a running wheel 36 having its plane in the travelling direction H. The beam 24c' is supported by a swivel wheel 37.

The device can be changed into a swath turner adapted to turn three swaths simultaneously. To this end, the beams 24a', 24b' and 24c' are moved into positions 24d', 24e' and 24f', respectively, by pivoting the same on teeth 32, 33 and 34. With the beams locked in these positions, the swath turner thus formed is moved in the direction of the arrow K by means of the adjustable arm 26 locked in position 26e'. The wheel 36 is conventionally fixed in position at a right angle to its original position and the swivel wheel 37 automatically takes its new and correct position.

The beams 24d', 24e' and 24f' are advantageously adapted to be turned together with their rake wheels by an angle of 180° so that the device may be used as a swath turner to be moved in a direction opposite to the direction of the arrow K. This is possible due to the elevated position of the coupling member 31 and any detrimental interference of the parts of the device with each other is thereby avoided.

In summary, with reference for example to Fig. 1, a raking device in accordance with the invention may include a mobile frame 4 supporting a number of rotary raking wheels 1a-f in parallel planes disposed at an angle to the direction of travel V. An end 11a of arm 11 (or 14) is connected at a pivot P and by means of bow 10 to said frame to permit a horizontal swinging movement therebetween. The length of the arm is substantially greater than the distance between P and any of the planes of rotation of the wheels. The arm has an elevated portion 11a which facilitates the coupling of the arm and frame, the other end 11b of the arm being at a lower elevation and facilitating connection to bracket 13.

The arm is adjustable between at least two locked positions indicated at 11 and 14 with conventional locking means (see Patent No. 2,447,354) included at P to lock the arm in position, the free or other end 11b or 14b being disposed at one side of all planes of rotation. The locking means may also be considered as including bracing bar 17 or 18 connected at its ends between the arm and frame at positions spaced from P.

The arm can be provided with a running wheel 15, and the trailing end 4a' can be provided with an extension 6, 7 for connection to a front end of a tractor 8, a running wheel 16 being provided in conventional detachable manner proximate to said extension.

The frame can be provided as a plurality of bearing supports such as, for example, 4a and 4b in Fig. 2 rotatable about vertical axes such as AX so that the device is readily convertible for different functions.

It will be readily understood that the novel coupling of a frame and its arm as indicated above provides a simplified device which is readily manipulated for purposes of performing its many different functions and for achieving the many advantages noted above.

What is claimed is:

1. A raking device comprising a mobile frame, a plurality of rotary raking wheels mounted on said frame and rotatable in substantially parallel planes disposed at an angle to the direction of travel of said mobile frame, an arm, means pivotally connecting one end of said arm to said frame intermediate the planes of rotation of two of said raking wheels and permitting horizontal swinging adjustment of said arm relative to said frame, the length of said arm being substantially greater than the distance from where the arm is connected to said frame to any of said planes of rotation of the raking wheels, and said arm having an elevated portion which is disposed at an elevation above the highest portions of said raking wheels.

2. A raking device as in claim 1; wherein the other end of said arm is disposed at an elevation substantially below that of said elevated portion of the arm.

3. A raking device as in claim 1; further comprising locking means between said frame and said arm and operative to lock the latter in a selected one of at least two locked positions where the other end of said arm is disposed at one side of all of said planes of rotation of the raking wheels and at the other side of all of said planes of rotation of the raking wheels, respectively.

4. A raking device as in claim 3; wherein said locking means includes a bracing bar connected, at its opposite ends, to said arm and frame, respectively, at locations spaced from said location where said arm is connected to said frame.

5. A raking device as in claim 1; further comprising a running wheel detachably mounted on said arm adjacent the other end of the latter.

6. A raking device as in claim 1; wherein said frame, at the trailing end thereof considered in said direction of travel, has an extension thereon adapted for coupling to the front end of a tractor.

7. A raking device as in claim 6; further comprising a running wheel detachably mounted on said frame at a location proximate to said extension.

8. A raking device as in claim 6; further comprising a running wheel mounted on said frame at a location proximate to said extension and swingable about a vertical axis relative to said frame.

9. A raking device comprising a mobile frame including a coupling member for imparting travelling movement thereto, a plurality of bearing supports mounted on said coupling member and being rotatable about vertical axes with respect to the latter, rotary raking wheels mounted on said bearing supports and being rotatable with respect to the latter in vertical planes of rotation, and locking means between each of said bearing supports and said coupling member and operative to lock the related bearing support in a selected one of two locked positions spaced angularly from each other about the related vertical axis of rotation of the bearing support relative to said coupling member.

10. A raking device as in claim 9; wherein said coupling member has a bow-shaped configuration and includes an elevated central portion and two downwardly extending legs depending from the latter, said bearing supports being rotatably mounted on the lower ends of said legs.

11. A raking device as in claim 9; wherein said coupling member has a comb-like configuration and includes a generally horizontal elevated portion and at least three downwardly extending, spaced apart legs depending from said elevated portion, said bearing supports being rotatably mounted on the lower ends of said legs.

12. A raking device as in claim 9; wherein each of said bearing supports includes an elongated, generally horizontally extending member, and said elongated members of the bearing supports are in longitudinal alignment with each other when held in one of said locked positions by the related locking means.

13. A raking device as in claim 9; wherein each of said bearing supports includes an elongated, generally horizontally extending member, and said elongated members of the bearing supports are disposed parallel to each other when held in one of said locked positions by the related locking means.

14. A raking device as in claim 1; wherein at least two of said raking wheels are rotatably mounted on each of said bearing supports.

15. A raking device as in claim 9; further comprising a running wheel mounted on at least one of said bearing supports and disposed so that the highest portion of said running wheel is at an elevation below the elevation of the lowest portion of said coupling member.

References Cited in the file of this patent

UNITED STATES PATENTS

| 2,447,354 | Morrill | Aug. 17, 1948 |
| 2,472,260 | Morrill | June 7, 1949 |
| 2,683,345 | Meyer | July 13, 1954 |

FOREIGN PATENTS

| 500,470 | Great Britain | Feb. 6, 1939 |
| 986,330 | France | Mar. 21, 1951 |

OTHER REFERENCES

Information Circular No. 4, titled "A Progress Report on the Finger Wheel Rake," from the Department of Agricultural Engineering, N.C. Agricultural Experiment Station, dated May 1951.